Sept. 30, 1969   J. H. ANDERSON   3,469,607
RADIALLY DEFLECTABLE CONCENTRIC PIPE SUPPORT
Filed March 8, 1967   3 Sheets-Sheet 1

INVENTOR.
JAMES H. ANDERSON
BY
Cushman, Darby & Cushman
ATTORNEYS

Sept. 30, 1969          J. H. ANDERSON          3,469,607
RADIALLY DEFLECTABLE CONCENTRIC PIPE SUPPORT
Filed March 8, 1967          3 Sheets-Sheet 2
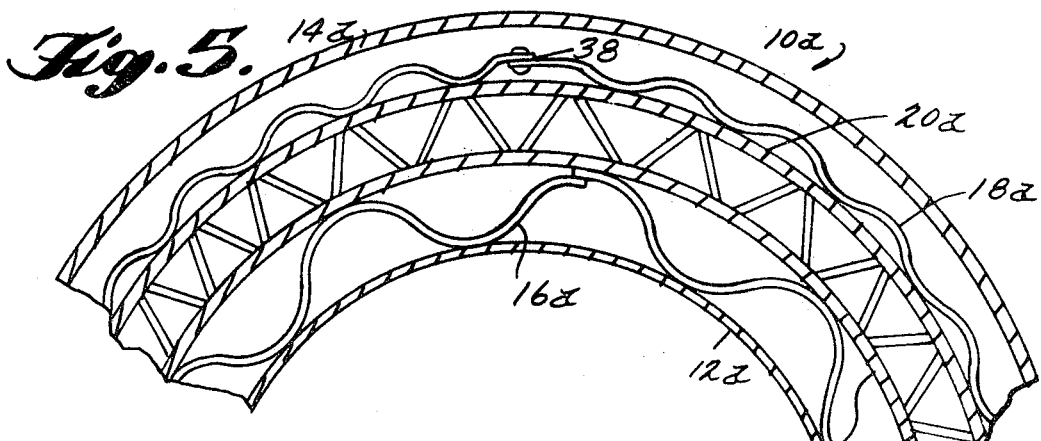
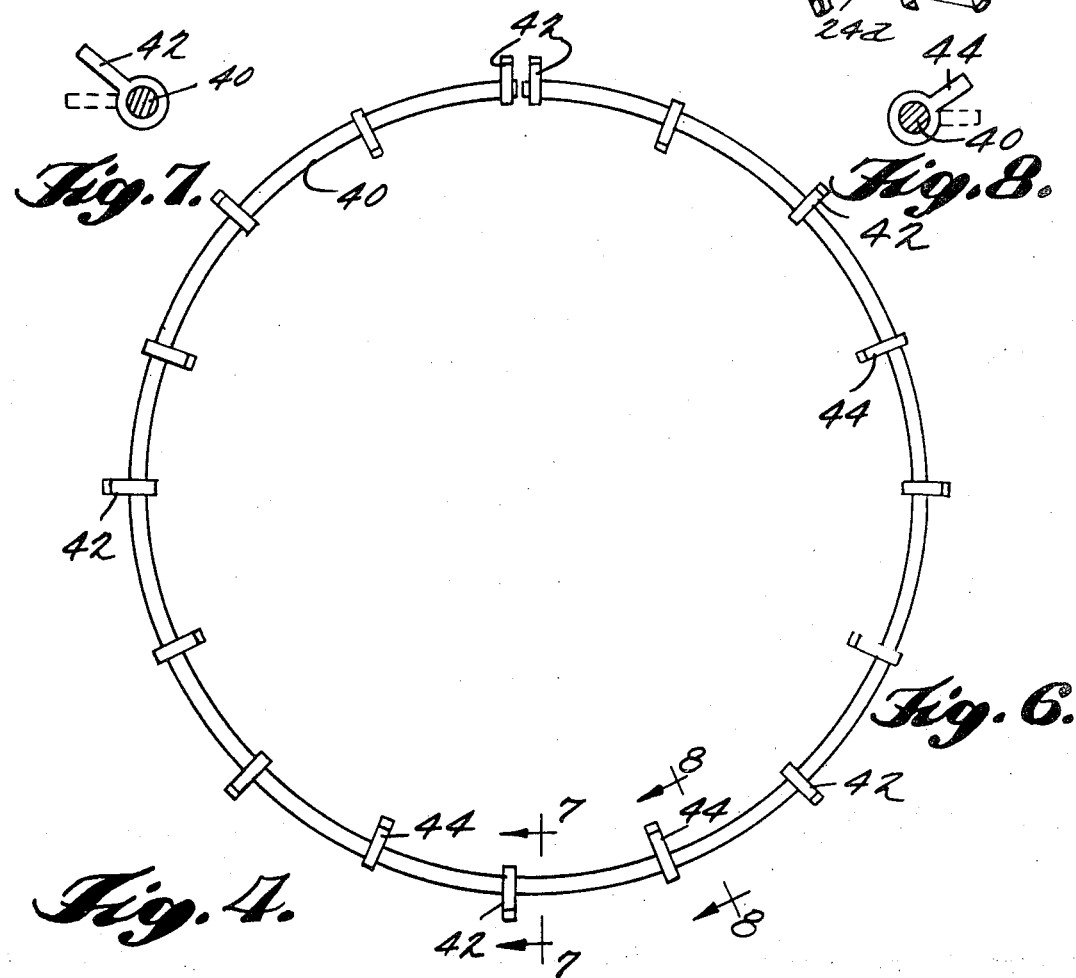
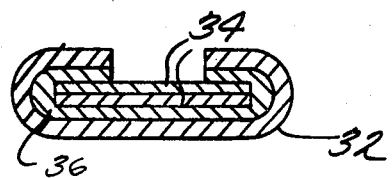
INVENTOR.
JAMES H. ANDERSON
BY
Cushman, Darby & Cushman
ATTORNEYS Sept. 30, 1969 J. H. ANDERSON 3,469,607
RADIALLY DEFLECTABLE CONCENTRIC PIPE SUPPORT
Filed March 8, 1967 3 Sheets-Sheet 3
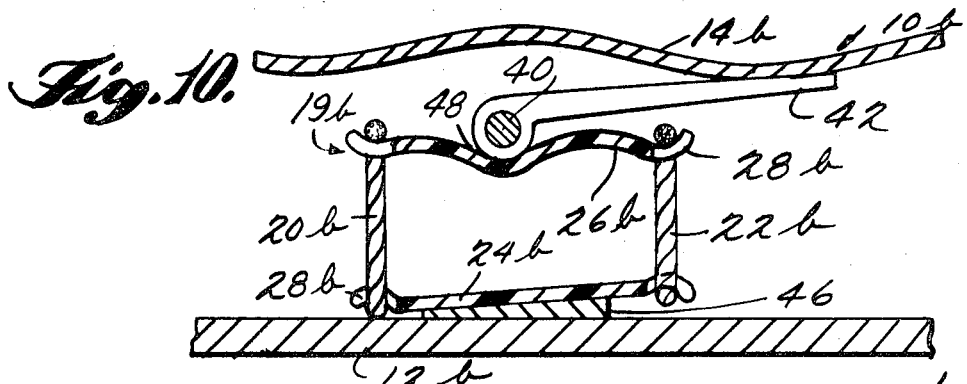
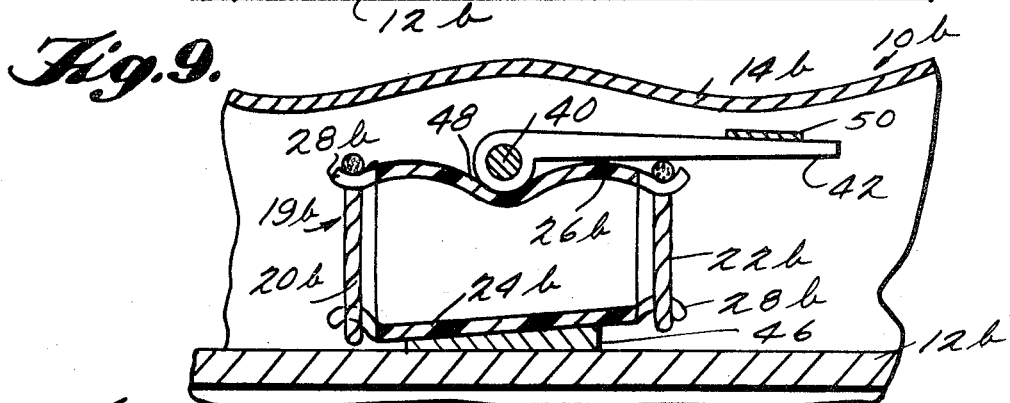
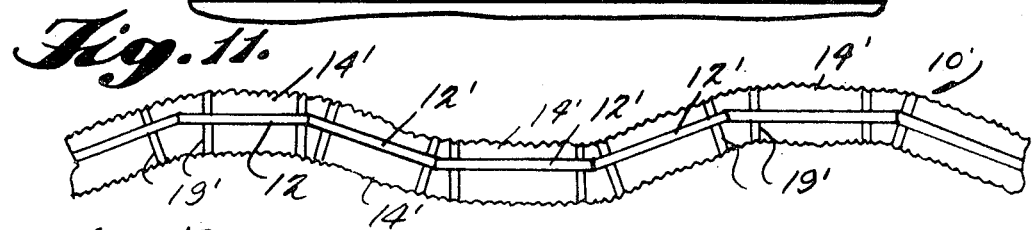
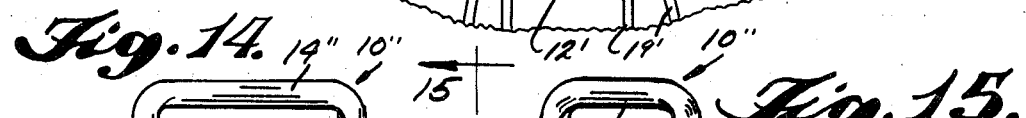
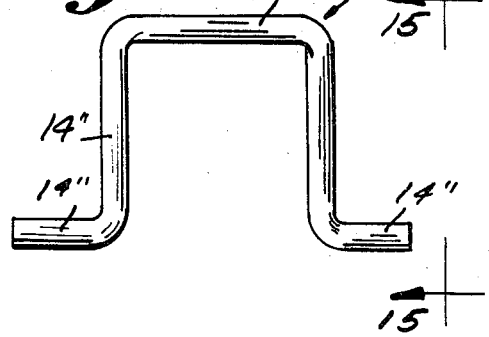
INVENTOR.
JAMES H. ANDERSON
BY
Cushman, Darby & Cushman
ATTORNEYS United States Patent Office 3,469,607
Patented Sept. 30, 1969

3,469,607
RADIALLY DEFLECTABLE CONCENTRIC
PIPE SUPPORT
James H. Anderson, 1615 Hillock Lane,
York, Pa. 17403
Filed Mar. 8, 1967, Ser. No. 621,575
Int. Cl. F16l 9/18, 11/04
U.S. Cl. 138—113                    12 Claims

ABSTRACT OF THE DISCLOSURE

A vacuum-jacketed pipeline comprising an inner pipe, an outer pipe and a suspension system for maintaining the pipes in spaced-apart relationship. The suspension system includes axially spaced-apart support rings each associated with a radially expanded spring member which permits some eccentric movement of the inner pipe. The pipeline is wave-shaped as an aid in converting thermal contraction and expansion of the inner pipe into eccentric movement.

---

This invention relates to annular vacuum jackets employed for thermally insulating pipelines and the like and in particular to improved arrangements by means of which an inner pipe structure is suspended in an outer pipe structure.

In copending application Ser. No. 374,448 filed June 11, 1964, now Patent No. 3,351,224, there is disclosed a vacuum jacket arrangement which employs a system of internal spokelike cables for suspending an inner pipe or vessel within an outer casing. The space between the pipe and the casing when evacuated, is thermally non-conductive, the only path for conduction of heat being the cables and the supports for the same. The cables are arranged to effect a very small cross sectional area through which heat is conducted so that heat leakage between the inner pipe and the outer casing is maintained at a very low level. Broadly, the suspension system of that system includes flexible cables of low heat-conductive material, such as glass fiber, extending across the annular space between the inner pipe and the vessel. Preferably, the cables extend in tension between spaced inner and outer concentric rings of low heat-conductive material, the inner ring being secured to the exterior of the inner pipe and the outer ring being secured to the inner surface of the outer casing. Alternatively, the rings may be replaced with helices constructed of a material of low thermal conductivity, the inner helix being carried on the inner pipe and the outer helix being carried by the casing. In both cases it is preferred to string the cables angularly across the annular space, rather than radially, so as to present as long a heat conductive path as possible.

The aforementioned patent also discloses a method of assembling the concentric ring and cable system which comprises assembling the inner pipe, both concentric rings and cables as a unit, sliding the outer casing over the unit and expanding the outer rings into frictional engagment with the inner circumference of the outer casing to thereby retain the inner pipe and outer casing in fixed relationship.

It is the primary object of the present invention to provide improved suspension arrangements of the general type described above, the improved arrangements being adapted to permit some deflection and eccentricity of the inner pipe with respect to the outer casing for purposes of allowing relative expansion and contraction between the two. Broadly, this is accomplished by employing springs which clamp either or both of the support rings to the respective pipe or casing.

In one type of construction, according to the present invention, a ring-shaped expander spring, much like an expander spring as conventionally employed behind a piston ring, is disposed between a support ring and the respective pipe. The spring is initially compressed, as with a circumscribing band or the like, following which the band is released so as to permit the spring to expand radially, thereby clamping the support ring in place. In another type of construction, a ring-shaped torsion spring is disposed between the support ring and the respective pipe. The torsion spring carries lever-like elements which are biased by the spring into engagement with the pipe or casing.

It is a further object of the present invention to employ a radially-deflective support, such as described above, in a manner to reduce stress in a long pipeline caused by large changes in the temperature of the inner pipe. Broadly, this feature of the invention is realized by constructing a double-walled pipeline in a wave shape with the inner pipe being suspended in the outer casing in a manner to allow the inner pipe to assume an eccentric position against the biasing action of the supports. As will be described more in detail hereinafter, this arrangement converts some of the thermal expansion or contraction of the inner pipe during a temperature change into eccentric movement of the inner pipe.

The invention will be further understood from the following detailed description taken with the drawings in which FIGURE 1 is a fragmentary transverse sectional view taken through a vacuum jacketed pipeline constructed in accordance with the principles of the present invention;

FIGURES 2 and 3 are sectional views, on an enlarged scale, taken on the lines 2—2 and 3—3 of FIGURE 1;

FIGURE 4 is a fragmentary sectional view showing the connection between then ends of one of the bands of FIGURE 1 prior to release of the connection;

FIGURE 5 is a fragmentary transverse sectional view illustrating a second form of supporting arrangement;

FIGURE 6 is a plan view of a torsion spring for use in a third form of supporting arrangement;

FIGURES 7 and 8 are sectional views taken on the lines 7—7 and 8—8 of FIGURE 6;

FIGURES 9 and 10 are fragmentary transverse sectional views illustrating the use of the torsion spring of FIGURE 6 in a pipeline;

FIGURES 11, 12 and 13 are schematic elevational views of a wave-shaped pipeline illustrating the use of radially deflectable suspension means for reducing stress resulting from expansion and contraction of the inner pipe;

FIGURE 14 is a schematic elevational view of a different form of wave-shaped pipeline; and FIGURE 15 is an elevational view looking in the directions of the arrows 15—15 in FIGURE 14.

Figure 1:
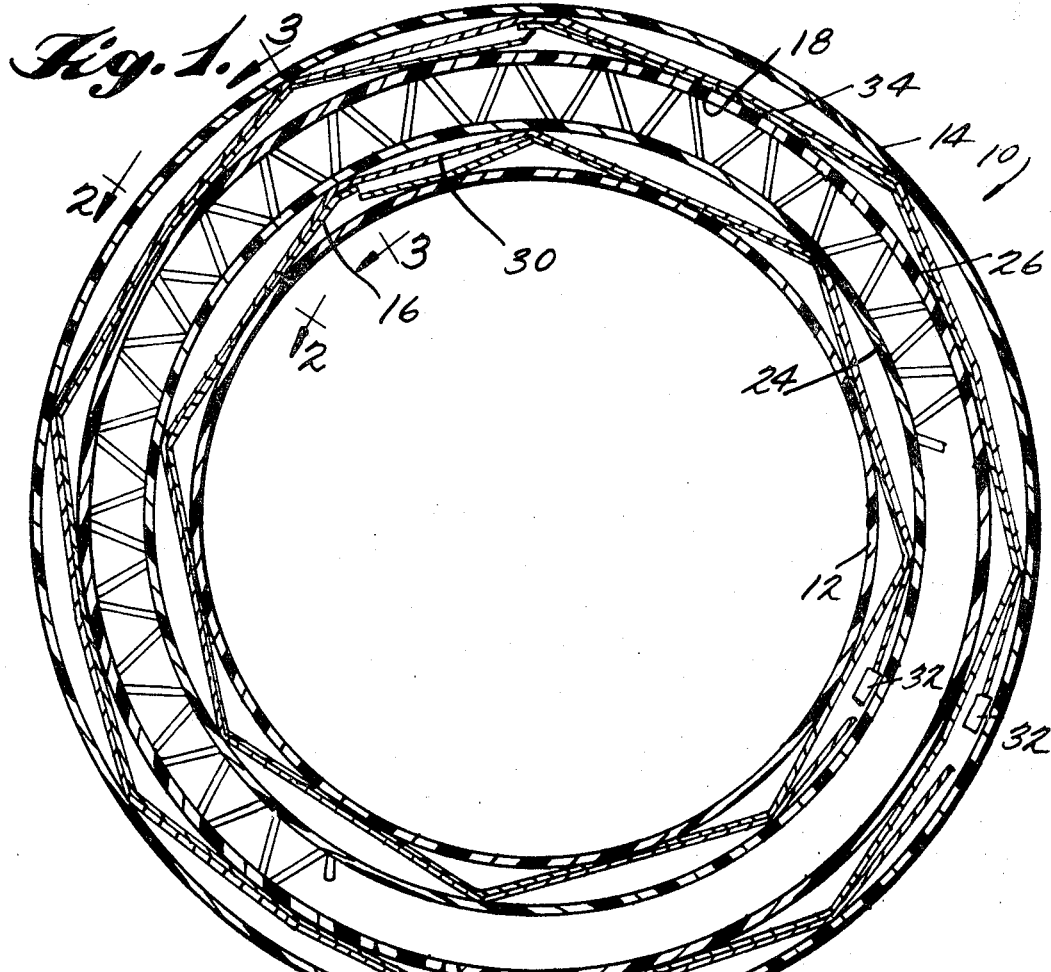
Figure 2:
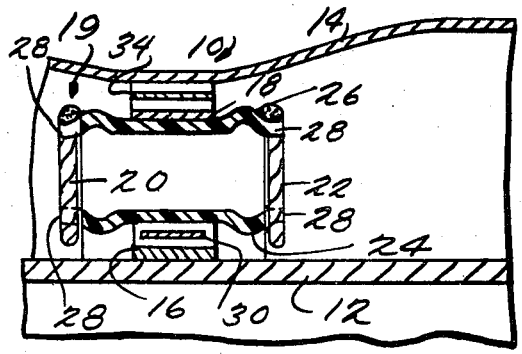
Figure 3:
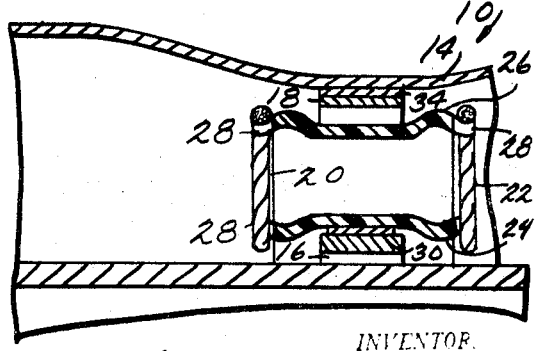

FIGURE 1 illustrates a vacuum-jacketed pipeline 10 adapted for transporting a fluid which has a temperature very different from ambient temperature. The fluid, for example, liquid methane, is pumped through an inner, high-strength pipe 12 which is surrounded by an outer, cylindrical casing 14, the annular space between the two being evacuated to a very low pressure. The outer casing 14 may be of less massive construction than the inner pipe 12, and as shown, is formed of a relatively thin-walled tube which is corrugated when viewed in longitudinal section, as seen in FIGURES 2 and 3.

As will be understood, the pipeline 10 is constructed of a plurality of lengths of the inner pipe 12, each of which is disposed within a corresponding length of outer casing 14, the lengths being joined together in a leak-tight manner. The annular space is evacuated in any suitable manner, as by means of a vacuum pump (not shown). Details of a preferred manner of constructing the joints between the lengths and maintaining an insulating vacuum may be found in copending application Ser. No. 440,527, filed Mar. 17, 1965, now Patent No. 3,360,001.

The presence of the transverse corrugations in the wall of the outer casing 14 renders the latter circumferentially stiff with the result that it resists collapse of the casing 14 from external pressure. In addition, the corrugations permit the casing 14 to be bent easily to conform to a wave-shaped inner pipe and to expand or contract axially to follow the expansion or contraction of the inner pipe during installation of a pipeline.

The inner pipe 12 is suspended in the outer casing 14 by means of inner and outer expander springs 16 and 18 and a ring assembly 19, the latter including a pair of tensioned cables 20 and 22 strung between inner and outer support rings 24 and 26. Each of the support rings 24 and 26 is provided with a plurality of pins 28 which extend laterally from each edge in the direction of the axis of the ring. The rings 24 and 26 are disposed concentrically with the pins 28 on one ring being circumferentially offset from the pins on the corresponding edge of the outer ring.

One of the cables 20 is strung sequentially over and under the pins on one edge of the rings, and the other cable 22 is similarly strung over and under the pins 28 on the other edge of the rings. Then each cable is tightened, as by drawing its opposite ends together with a turnbuckle (not shown), with the result that the cables act similarly to the spokes of a wheel, thereby restraining the rings 24 and 26 against relative movement either radially or axially. The cables 20 and 22 should be constructed of low heat conductive material to minimize the conduction of heat through the elements themselves and through the points of contact betwen the cables 20 and 22 and the pins 28.

As seen in FIGURES 1, 2 and 3, each ring assembly 19 is clamped in the annular space between the inner pipe 12 and the casing 14 by means of the inner and outer expander springs 16 and 18. As shown, each spring is constructed of a wave-shaped strip of spring steel formed into an overall circular shape. If desired, a plurality of separate springs of arcuate shape may be provided. Each spring tends to expand radially with the result that the peaks of the waves hold the ring assembly in place. Since the pipe 12 is supported within the inner ring 24 by the spring 16, the arrangement centers the pipe 12 in the casing 14, but allows some deflection and eccentricity owing to the resiliency of both of the springs 16 and 18.

In assembling a section of pipeline 10 a length of inner pipe 12 is first prepared by mounting thereon a suitable number of ring assemblies 19 at axially spaced positions following which a length of casing 14 is slipped over the prepared pipe 12. First an inner spring 16 is wrapped around the circumference of the inner pipe 12. Then a band 30, such as a flexible metal strap, is placed around the spring 16 and drawn tight to compress the waves and force the free ends of the spring 16 to move circumferentially to thereby reduce the diameter of the spring. The ends of the band are then connected together with a releasable clamp 32, following which the ring assembly 19 is slipped over the inner pipe 12 to a position concentric with the compressed inner spring 16. The clamp 32 is released, allowing the spring 16 to expand radially into tight engagement with the inner periphery of the inner ring 12 while maintaining contact with the pipe 12.

Each of the ring assemblies 19 is provided, either before or after mounting on the pipe 12, with an outer expander spring 18 which is wrapped around the outer support ring 26. The outer springs 18 are compressed with a band 34 which includes a releasable clamp, in the same manner as the inner springs.

When a suitable number of ring assemblies 19 has been mounted on the length of inner pipe 12, a length of outer casing 14 is slipped over the pipe 12, the compressed outer springs 18 allowing sufficient clearance for this purpose. Then the outer bands 34 are released so that the outer springs 18 expand radially outwardly while maintaining contact with the periphery of the outer ring 26.

The releasable clamps 32 for the ends of the bands 30 and 34 may take the form illustrated in FIGURES 1 and 4. As shown, the ends of the band are overlapped a short distance and held tightly together by the clamp 32 which may be of the general type conventionally employed for clamping metal straps on boxes. Between the inner surface of the clamp 32 and the ends of the band is a layer of thermoplastic material 36 which has sufficient adhesion and shear strength to prevent the ends of the bands from separating. The material 36, which may be for example a low melting point alloy or a plastic, will melt or weaken when sufficient heat is applied. Release of the bands 30 and 34 can therefore be effected easily by applying heat, for example the flame of a welding torch, to the clamp. In the case of the outer spring 18, the heat can be applied to the outer casing 14 at the location of the clamp 32.

It is not always necessary to employ the inner spring 16, and in some cases it may be omitted. In such instances the inner ring may be fitted directly to the inner pipe.

FIGURE 5 illustrates a second form of expander spring clamp in which a band for initially compressing inner and outer expander springs is eliminated. In this form of construction, the inner and outer support rings 24a and 26a and the arrangement of the cables are identical with those in FIGURE 1. The inner and outer expander springs are the same as in FIGURE 1 except that they are maintained in a compressed condition by having their free ends releasably secured together, as with a rivet 38 of low melting point material, or with a releasable clamp such as the one shown in FIGURE 4. As shown, the outer spring 18a is being held in its compressed condition, whereas the inner spring has been released in order to hold the ring assembly 19a on the inner pipe 12a. Initial compression of the springs 16a and 18a may be effected by any suitable means such as a band (not shown) which is removed after the ends of the springs have been connected together.

FIGURES 6, 7, 8, 9 and 10 illustrate a third form of spring clamp arrangement in which a torsion spring 40 is employed in place of the previously described expander spring for the purpose of holding the support ring assembly 19b in place. As shown, the torsion spring 40 is formed from a length of wire or small diameter rod bent into circular shape and provided with a plurality of spaced-apart levers 42 and 44. The levers 42 and 44 are fixed to the spring 40 and extend outwardly therefrom in planes which are transverse to the spring axis, alternate levers extending approximately normal to the other levers when the spring 40 is at rest, as shown in FIGURES 6, 7 and 8. When any two adjacent levers are forced to rotate in opposite directions, for example to the dotted line positions shown in FIGURES 7 and 8, the portion of the spring 40 between those two levers will be placed in torsion. The adjacent levers will thus be biased toward their at-rest positions.

FIGURES 9 and 10 illustrate the use of the torsion spring 40 as a resilient clamp in a pipeline 10b to suspend a support ring assembly 19b and inner pipe 12b within an outer casing 14b. The support ring assembly 19b comprises an inner support ring 24b, and outer support ring 26b and spoke-like cables 20b and 22b, all of which may be of the same general construction previously described. In making up the pipeline 10b, the support rings 24b and 26b are first interconnected with the cables 20b and 22b and, as before, the resulting assembly together with one or more identical assemblies are slipped over a length of inner pipe 12b. A wedge-shaped split ring 46 is then forced into the clearance between the pipe 12b and the inner ring 24b thereby locking the support ring assembly to the pipe 12b. At this time, or previously, the torsion spring 40 is placed around the circumference of the outer support ring 26b, there being provided a groove 48 in the latter for receiving the spring 40. Then the sets of levers 42 and 44 are rotated in opposite directions toward the pipe 12b to provide radial clearance for a length of casing 14b. Each set of levers may be rotated by passing a band around them, drawing it tight and securing the ends of the band with a releasable clamp of the kind previously referred to. As shown in FIGURE 9, the levers 42 have been rotated clockwise from their at-rest position, and a band 50 has been applied to prevent their opposite rotation.

A length of casing 14b is then slid over the pipe 12b following which the levers 42 and 44 are released by removing their retaining bands. This allows the torsional forces in the spring 40 to rotate the sets of levers in opposite directions into tight engagement with the inner surface of the casing 14b. As seen in FIGURE 10, the levers 42 have rotated counterclockwise thereby creating a radially inward force on the outer support ring 26b. The levers 44 (not shown in FIGURES 9 and 10) create similar radially inward forces, because they have rotated clockwise into engagement with the casing 14b.

The above-described spring-type mounting arrangements provide a distinct advantage in that they permit sufficient clearance to allow the outer casing to be slipped over the combination of the inner pipe with the support ring assembly, after which the ring assembly can be made tight from outside the casing. This feature is particularly important when long lengths of pipe and casing are being assembled, because of the difficulty in attempting to tighten a large number of ring assemblies within a long annular space.

In addition to the assembly advantage, the spring arrangements are useful in reducing excessive stress in the support ring assemblies when the inner pipe expands or contracts in an axial direction due to changes in its temperature. This feature of the invention is realized from a combination of radial resiliency of the suspension system with a special arrangement of bends in the inner pipe and in the casing of a completed pipeline. In regard to this feature it will be understood that the radial resiliency of the suspension system can be achieved with means other than those described above. One suitable arrangement of bends is illustrated schematically in FIGURE 11 which shows a vacuum-jacketed pipe 10' made up of a plurality of straight lengths of inner pipe 12' suspended concentrically within corresponding lengths of outer casing 14'. The suspension means, illustrated schematically at 19', may be of the kind previously described, or of any other suitable construction which suspends the inner pipe 12' with sufficient resiliency to permit a small amount of eccentric movement of the pipe 12' relative to the casing 14'.

The lengths of concentric pipe and casing are joined end-to-end at angles such that the completed pipeline 10' is wave-shaped, this shape being emphasized in FIGURE 11 for clarity. In the particular arrangement illustrated, four lengths define one complete wave, but this relationship is not critical. The waves may lie in a single plane, or they may be helical, the latter shape being formed by disposing adjacent lengths in different planes. The wave shape may also be formed by bending long lengths to the desired shape.

If the pipeline 10 is laid in a trench in the ground and buried, the outer casing 14' becomes substantially fixed against overall expansion and contraction in axial directions, because of the anchoring effect of the earth on the corrugations. However, the corrugations permit local axial movement and bending when temperature changes tend to cause the casing 12' to expand or contract. The inner pipe, on the other hand, is not locked into the earth and will tend to undergo considerable axial movement with temperature changes, particularly changes of 200° F. such as might occur between the temperature of liquid methane, −140° F., and a ground temperature of 60° F.

Axial expansion of the inner pipe 12', magnified for clarity, is illustrated in FIGURE 12. In attempting to elongate, the pipe 12' emphasizes the already-present bends with the result that it pushes eccentrically on the suspension means 19'. The latter deflect until the expansion force component of the pipe 12' balances the opposing forces of the springs or other resilient elements in the suspension means against the wall of the casing 14'. The eccentric movement of the inner pipe 12' during expansion can be visualized with ease if one regards the outer casing 14' as being essentially immovable along its entire length and the inner pipe 12' as having fixed ends.

FIGURE 13 illustrates, in exaggerated form, the position and shape of the inner pipe 12' after it has contracted axially relative to the fixed casing 14'. It will be seen that the pipe 12' has tended to become straight with the result that its eccentricity is in a different direction from that illustrated in FIGURE 12.

FIGURES 14 and 15 illustrate another form of wave-shaped pipeline 10". In this construction equal lengths 14" of outer pipe are straight with each successive length lying in a plane which is at a right angle to the preceding length. The inner pipe (not shown) is similarly constructed. The resulting overall shape of the pipeline 10" is a modified helix which, when viewed axially as in FIGURE 15, shows the pipe centerlines arranged in a square. This square helix shape permits maximum contraction and expansion within the confines of a ditch of similar square size in transverse cross section.

Considering now a specific example of a pipeline in which the inner pipe carries liquid methane at −140° F., it will be appreciated that the maximum eccentricity of the inner pipe which could occur would result from a stoppage of gas flow. In such a situation the temperature of the pipe 12' might rise to ground temperature, for example 60° F. To reduce the magnitude of eccentricity and consequent stress which would occur under this condition, it is desirable that the pipe 12' be installed at an intermediate temperature of, for example, −40° F. This can be achieved with the following general procedure:

(1) Assemble a section of wave-shaped pipeline 10' by joining together lengths of concentric pipe and casing in the manner described previously. The completed section may be, for example, 1200 feet in length.

(2) Dig a trench conforming to the shape of the section of pipeline 10'.

(3) Place the section of pipeline 10' in the trench and weld to the ends of a previously installed section.

(4) Refrigerate the pipe and casing by circulating a refrigerated fluid through the annular pass between them at −40° F.

(5) Fill in the trench to anchor the casing in the earth in the position which it has assumed at this temperature.

(6) Remove the refrigerant and proceed to assemble and lay another section.

When the pipeline has been constructed in this manner, with the outer casing taking the free position of the inner pipe at −40° F., contraction stress will occur only between −40° F. and −140° F., and expansion stress will occur only at temperatures above −40° F.

While preferred embodiments of the present invention have been described, further modifications may be made without departing from the scope of the invention. Therefore, it is to be understood that the details set forth or shown in the drawings are to be interpreted in an illustrative, and not in a limiting sense, except as they appear in the appended claims.

What is claimed is:

1. A pipeline for transmitting a fluid at a temperature different from ambient temperature comprising: an inner pipe having a wave-shaped axis for containing the fluid; an outer casing having a wave-shaped axis surrounding said pipe and defining therewith an annular space, said pipe and casing each having a series of axially disposed bends so as to effect said wave-shape; and suspension means at axially spaced-apart locations in said annular space suspending said pipe generally along the axis of said casing in spaced-apart relationship to said casing, said suspension means being radially deflectable and allowing said pipe to move eccentrically within said casing to compensate for thermal expansion and contraction of said pipe relative to said casing.

2. A pipeline as in claim 1 wherein said casing is transversely corrugated.

3. A pipeline as in claim 1 wherein said pipeline is constructed of straight lengths of pipe each length being arranged at a right angle to the previous length so that the centerlines of said lengths define a square when said pipeline is viewed axially.

4. A pipeline as in claim 1 wherein said suspension means includes a deflectable spring for imparting deflectability to said suspension. means.

5. A pipeline as in claim 1 wherein said suspension means includes an inner ring member surrounding said inner pipe, an outer ring member surrounding said inner ring member, spoke-like elements interconnecting said ring members, and an arcuate spring disposed between and engaging one of said ring members and the adjacent pipeline structure.

6. An elongated vacuum-jacketed vessel or the like comprising: an elongated inner pipe-like structure; an elongated outer casing spaced from and enclosing said pipe-like structure and defining therewith an annular space adapted to be evacuated; and means in said annular space for suspending said pipe-like structure generally concentrically within said casing, said means including inner and outer concentric ring members, spoke means holding said ring members in spaced apart relationship, said inner ring member surrounding said pipe structure, and radially deflectable spring means engaging and exerting radial clamping force on the periphery of said outer ring and on the inner surface of said casing, said spring means being deflectable inwardly to provide clearance for sliding said casing longitudinally of said outer ring member during assembly.

7. A vessel or the like as in claim 6 wherein said spring means includes an arcuate expander spring having a wave-snape when viewed along the axis of the circle, said spring being wrapped around the periphery of said outer ring member whereby the peaks of the waves engage said outer ring and the inner surface of said casing.

8. A vessel or the like as in claim 6 wherein said spring means includes an arcuate torsion spring having lever elements rigidly connected thereto and projecting therefrom at spaced apart locations in planes which are transverse to the axis of said spring, said torsion spring being wrapped around the periphery of said outer ring member with said lever elements in engagement with the inner surface of said casing.

9. A pipeline as in claim 1 wherein said casing and said pipe are generally helical in overall shape thereby effecting said wave-shape.

10. A pipeline as in claim 1 wherein the bends in said casing lie in a single plane.

11. A pipeline as in claim 1 wherein said suspension means includes inner and outer concentric ring members, spoke means holding said ring members in spaced apart relationship, said inner ring member surrounding said pipe structure.

12. A pipeline as in claim 1 wherein said annular space is an evacuated space in order to reduce heat transfer between said pipe and said casing.

References Cited
UNITED STATES PATENTS

| | | | |
|---|---|---|---|
| 3,343,250 | 9/1967 | Berto et al. | 138—113 X |
| 347,594 | 8/1886 | Haas | 138—122 |
| 570,634 | 11/1896 | Hicks | 138—113 |
| 1,761,084 | 6/1930 | Lissauer | 138—113 |
| 2,401,974 | 6/1946 | Siebels | 138—114 XR |
| 3,126,918 | 3/1964 | Eaton | 138—113 |

FOREIGN PATENTS 784,698   10/1957   Great Britain.

MERVIN STEIN, Primary Examiner

U.S. Cl. X.R.

138—114